May 10, 1949. J. T. TIERNEY 2,469,754
SETTING MECHANISM FOR CALCULATING MACHINES
Filed Dec. 14, 1943 5 Sheets-Sheet 1
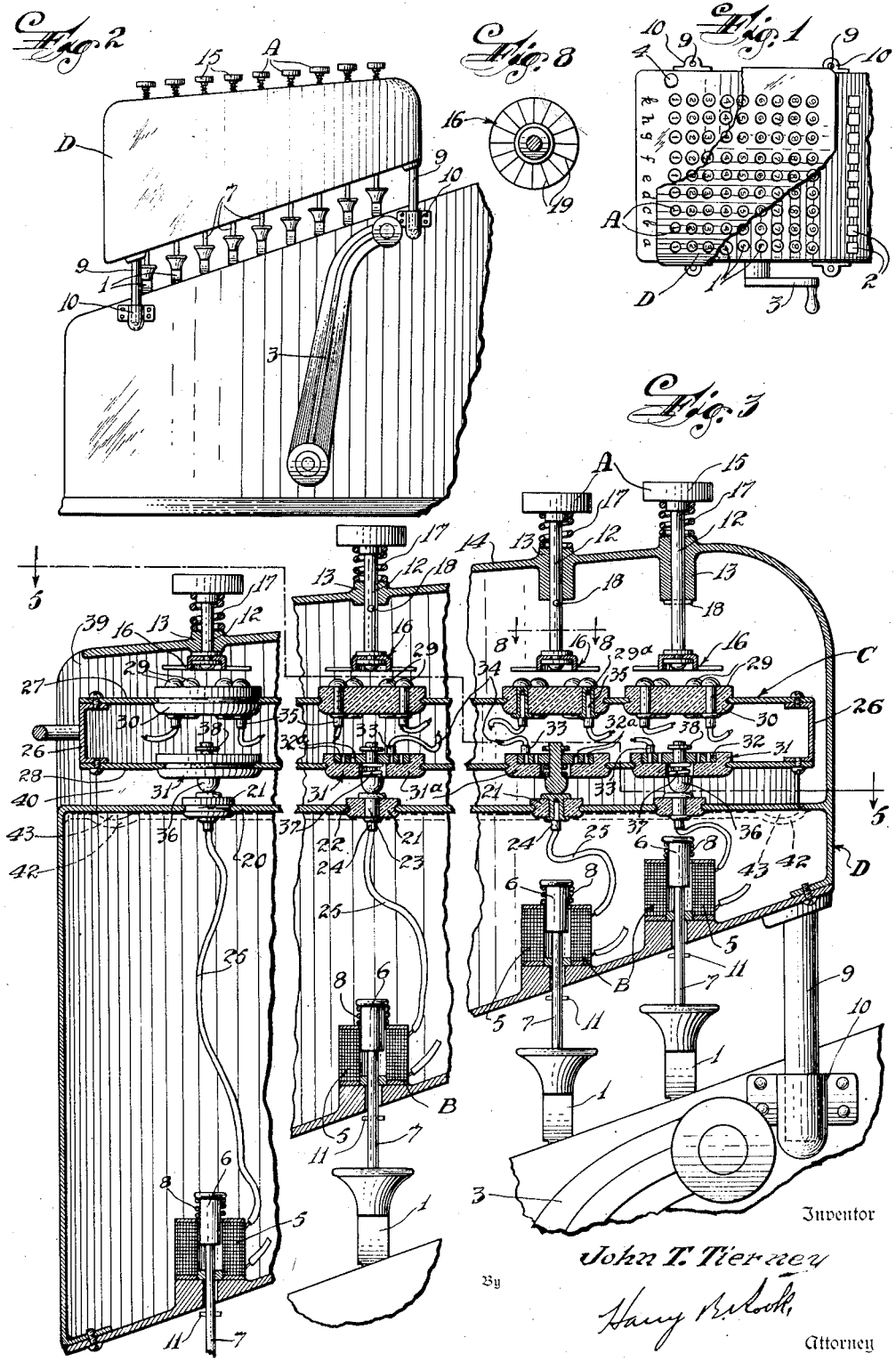
Inventor
John T. Tierney
By
Harry B. Cook,
Attorney May 10, 1949.  J. T. TIERNEY  2,469,754
SETTING MECHANISM FOR CALCULATING MACHINES
Filed Dec. 14, 1943  5 Sheets-Sheet 2

Inventor
John T. Tierney
By
Harry B. Cook,
Attorney

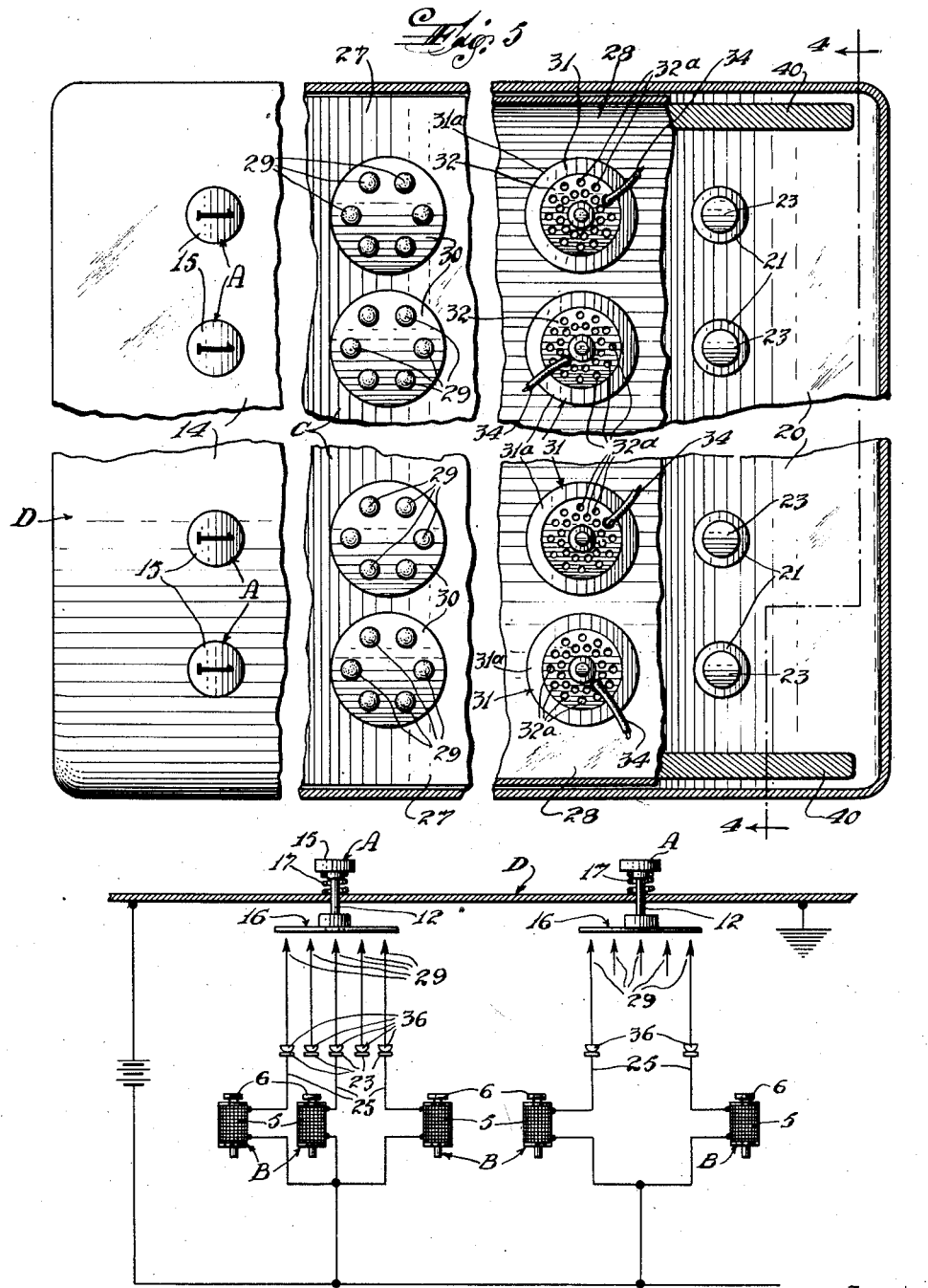

May 10, 1949. J. T. TIERNEY 2,469,754
SETTING MECHANISM FOR CALCULATING MACHINES
Filed Dec. 14, 1943 5 Sheets-Sheet 4
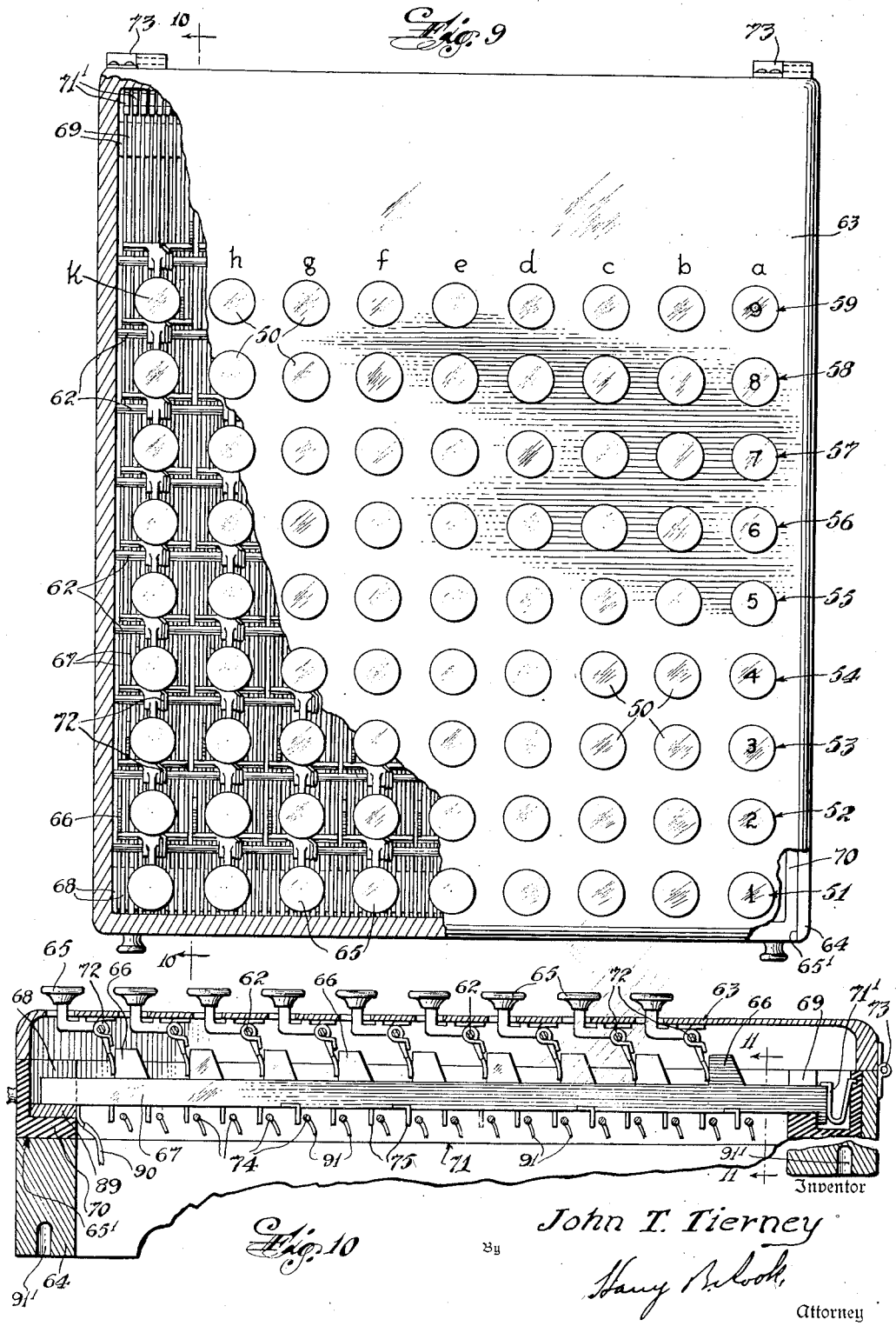

May 10, 1949.   J. T. TIERNEY   2,469,754
SETTING MECHANISM FOR CALCULATING MACHINES
Filed Dec. 14, 1943   5 Sheets-Sheet 5
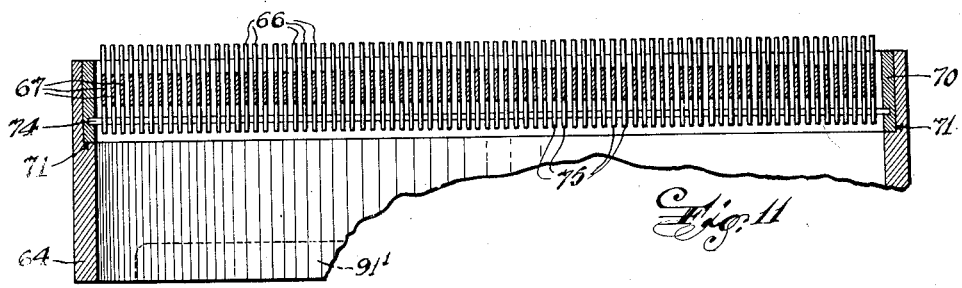
Inventor
John T. Tierney
By
Harry B. Cook,
Attorney Patented May 10, 1949

2,469,754

UNITED STATES PATENT OFFICE 2,469,754

SETTING MECHANISM FOR CALCULATING MACHINES

John T. Tierney, Union, N. J.

Application December 14, 1943, Serial No. 514,221

3 Claims. (Cl. 171—97)

This invention relates in general to calculating or computing machines and more particularly to means for operating the keys or for setting up the stops or other instrumentalities which determine the expression or number placed in the adding or accumulator mechanism.

One object of the invention is to provide novel and improved means for setting calculating or computing machines to handle a wide range of computation problems, for example to calculate interest on money or to compute payroll memoranda, or to calculate the quantity and cost of for example gas or electricity supplied by a public utility company during a given period of time, such that said problems can be handled more simply, with greater speed and with less mental effort and memory on the part of the operator than have been possible with heretofore known calculating apparatus.

In general, the setting mechanism which comprises my invention, contemplates power-operated means, for example electromagnets or fluid pressure motors for directly actuating the keys, stops, or the other instrumentalities of a known type of calculating machine which determine the number to be placed in the adding or accumulating mechanism, and manually-operated means such as electric switches or valves, for controlling said power-operated means. The manually operated means may include a plurality of master setting elements, for example master keys, push buttons or the like, each of which controls the operation of a plurality of said keys or stops or other instrumentalities of the calculating machine. Taking a particular example, my setting mechanism may be adapted to the computation of interest on money, in which case each of a plurality of said master keys may represent one item in the principal amount of say $9876, i. e. one master key may represent the item of $9000 in the principal amount, while another master key may represent the item $800, another $70 and another $6; and each master key may control simultaneous setting of the plurality of keys, stops, etc., of the calculating machine which correspond to the respective digits and ciphers that comprise the representation of the amount of interest at a given rate and for a given period of time on each of said items. For example for the interest on the item $800 at the rate of 1% for one day, the keys, stops, etc., corresponding to the ciphers and digits .02223 will be actuated. After the master keys for all of said items have been manipulated, the calculating and registering mechanism of the machine will be operated in the usual manner whereupon the total indicated will show the proper amount of interest for said principal amount.

It will be understood that the keys of the calculating machine may be omitted and the setting mechanism comprising my invention may control directly the mechanism which usually is actuated by said keys.

From the foregoing, it will be seen that the value of such a machine depends in a large degree upon the range or variety of computation problems that can be handled and the facility with which the machine can be adjusted, changed, modified or adapted to different problems of computation. Therefore, another object of my invention is to provide novel and improved means by which my setting mechanism can be adjusted or modified to permit computation of different problems, by the interchanging of simple similar units, e. g. by the removal of one unit such as a panel or plate and the insertion or substitution therefor of another unit, so that the change can be made easily, quickly, with a minimum of mechanical manipulations and by a relatively unskilled person.

Another object is to provide a mechanism of the character described which shall comprise a novel and improved construction and combination of a series of master setting elements such as master keys, one or more units of the general character described, and means for actuating said keys or stops, etc., of a calculating machine, which shall be simple and inexpensive, reliable and durable in construction and operation; and to provide such a combination wherein each said unit shall comprise a panel that is slidable into and out of a certain position so that it can be interposed between said series of master setting elements or master keys and said means for actuating the keys, etc., of the calculating machine, whereby application and removal of such units at will respectively to and from the mechanism, e. g. to interchange the units, shall be easy and simple.

Further objects are to provide a novel and improved panel of the character described which shall have a chamber therein, a plurality of members on each of opposite walls of said chamber to cooperate respectively with said master setting elements and the means for actuating said keys or stops, etc., of the calculating machine, and means within said chamber between said walls for operatively connecting and correlating said members on said opposite walls so that each of said members on one wall will directly cooperate with a plurality of said members on the other wall; and to provide such an interchangeable unit wherein said members include electrical contact studs and said means connecting and correlating said members are electrical conductors.

Other objects, advantages and results of the invention will be brought out by the following description in conjunction with the accompanying drawings in which Figure 1 is a schematic top plan view of my combination of a setting mechanism and a calculating machine with portions of the setting mechanism broken away for clearness in illustration.

Figure 2 is an enlarged schematic side elevational view of the combination of the setting mechanism and the calculating machine.

Figure 3 is a further enlarged and fragmentary vertical longitudinal sectional view of the combination of the setting mechanism and calculating machine with portions shown in side elevation.

Figure 5 is a horizontal sectional view taken on several planes along the line 5—5 of Figure 3.

Figure 7 is a wiring diagram showing the electrical circuits including the setting element switches, contact elements of the setting control unit and actuators for the operating members of the calculating machine, and Figure 8 is a horizontal sectional view on the line 8—8 of Figure 3 showing one of the switch contact members of one of the setting elements.

Figure 9 is a top plan view of another form of setting mechanism embodying my invention, with portions broken away for clearness in illustration.

Figure 10 is a vertical sectional view on the line 10—10 of Figure 9, and

Figure 11 is a transverse vertical sectional view on the line 11—11 of Figure 10.

Figure 4:
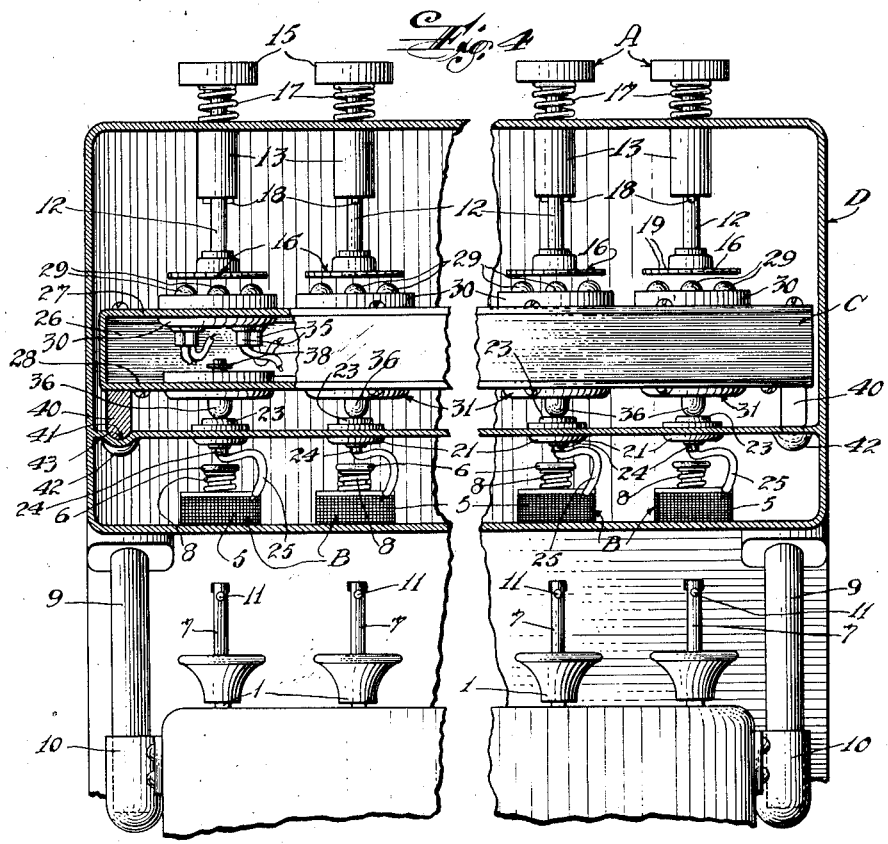
Figure 4 is a transverse vertical sectional view on the line 4—4 of Figure 3.

My setting mechanism may be utilized with various types of adding or calculating machines but for the purpose of illustration I have shown in Figure 1 one known type of calculating machine which has a keyboard comprising nine rows of keys, *a, b, c, d, e, f, g, h,* and *k* with nine keys 1 in each row numbered from 1 to 9 as shown. The operation of the machine is well known and will require no detailed description, although it may be pointed out that the desired numbers of each row are selected by depressing the keys, and the numbers are registered in window openings 2 following actuation of the lever 3. The totals are registered in the same way by depressing the totalizer key 4 after the other keys have been operated and before the lever 3 is actuated. The adding or calculating mechanism of the machine is of the usual construction, for example being provided with stops which are set up by operation of the keys. Upon operation of the handle 3 after the keys have been depressed said stops determine the number placed in the main adding or accumulator wheels which are displayed through the window openings 2. The keys really constitute operating members of the machine and are connected to the calculating mechanism.

Associated with the operating members or keys of the calculating machine is my setting mechanism which in general comprises a plurality of setting elements A one of which in the illustrated form of the invention is provided for each of the keys of the calculating machine. These setting elements control the operation of actuators B, one of which is provided for each operating member or key of the adding machine, and a setting control unit generally designated C is provided to cooperate with the setting elements and the actuators so that each of the setting elements may control a plurality of actuators B and consequently a plurality of the operating members or keys 1 of the calculating machine.

In the present instance the actuators B are shown as comprising electromagnets each of which includes a coil 5 and an armature 6 which has a stem 7 that abuts the corresponding key or operating member 1 of the calculating machine. It is desirable that springs 8 be provided for moving the armatures 6 upwardly or in the direction to release the operating members 1. Preferably the actuators are mounted on a suitable support such as a casing D which in turn is removably mounted on the calculating machine as by means of legs 9 on the casing that removably set in sockets 10 on the calculating machine. With this construction the actuators B are mounted in superposed relation to the keyboard of the calculating machine with the stem 7 of each actuator in abutting contact with one of the keys 1 of the calculating machine as clearly shown in Figures 3 and 4. Desirably stop pins or the like 11 are provided for limiting movement of the stems 7 of the actuators under the influence of the springs 8.

The setting elements A may be mounted on a separate support or in a separate casing in remote relation to the calculating machine, but as shown in the drawings the setting elements A comprise rods 12 which are reciprocably mounted in bearings 13 in a wall 14 which may comprise a part of the casing D. As shown, each of the setting units is disposed in vertically alined relation with one of the operating members 1 of the calculating machine. The rods 12 project at their opposite ends inwardly and outwardly of the casing D, respectively, and the outer ends carry finger pieces 15 which form keys and may have numbers corresponding to the keys 1 of the calculating machine. At the other end of the rod 12 of each setting element is a switch contact member 16 which cooperates with contact studs on the setting control unit C about to be described. A spring 17 normally influences each of the setting element rods 12 upwardly into a normal position which is determined by a stop pin or the like 18 on the rod that abuts the inner end of the corresponding bearing 13. The stops 18 are so located that when the setting elements are in their normal positions, all of the switch contact members 16 will be disposed in a common plane as shown in Figure 3. Each contact member 16 is intended to engage a plurality of annularly arranged contact studs 29 and to provide adequate resiliency to ensure contact of the switch contact member with all of the corresponding studs at the same time, the switch contact member may be in the form of a disc having radial slits 19 extending inwardly from its edge as more clearly shown in Figure 8.

The casing D has an intermediate wall or partition 20 between the contact members 16 and the actuators B and in this wall or partition is arranged a plurality of contact devices 21, one for each of the actuators B. As shown, each contact device 21 is preferably arranged in axial alinement with the corresponding actuator B and the corresponding setting element A, although this is not essential. The contact devices 21 may be of any suitable construction but are shown as comprising discs or blocks of insulating material preferably separably secured in openings 22 in the wall 20 and having electrical conducting studs 23 secured therein. Conveniently each of the studs may have a socket to receive a terminal plug 24 on the end of the wire or other electrical connector 25 which connects the contact device to the coil 5 of the actuator B. Other ways of connecting the contact devices to the wires will occur to those skilled in the art.

As shown, the contact studs 23 extend through the wall 20 and are exposed on the side of the wall facing the setting elements.

The setting control unit C is removably arranged between the switch contact members 16 of the setting elements and the contact devices 21. The details of construction of the setting unit C may be widely modified, but as shown, the unit comprises a panel including an annular frame 26 to which are separably secured spaced and opposed walls 27 and 28 that constitute walls of a chamber that is formed between the plates and the frame 26. Mounted in the upper wall 27 is a group of contact studs for each of the setting elements, each group of contact studs constituting one part of a multiple electric switch of which the contact member 16 comprises the other part. Any suitable number of contact studs may be provided, but as shown there are six studs 29 in each group. The studs may be mounted as desired but the studs of each group is shown as secured in a disc or block of electrical insulation material 30 which is removably mounted in an opening in the wall 27. The studs of each group are annularly arranged in spaced and insulated relation to each other with their ends in a common plane parallel to the plane of the corresponding switch contact member so that all of the studs may be engaged at the same time by said switch contact member.

On the lower wall 28 of the setting control unit C are mounted contact devices 31, one for each of the contact devices 21 and consequently one for each of the actuators B and operating members 1 of the calculating machine. These devices may be of any suitable construction so that a plurality of the contact studs 29 may be connected thereto. As shown, each of these contact devices includes a block or disc 31a of insulating material which is separably mounted in and projects through the wall 28 and has a conducting plate 32 on its end that faces the corresponding group of contact studs 29. The plate has a plurality of holes or sockets 32a each of which may receive a terminal plug 33 on the end of a wire or other electrical conductor 34 the other end of which may have a similar terminal plug 35 to fit a socket 29a in any of the studs 29.

A contact element 36 is reciprocable in each disc 31 and in electrical contact with the corresponding disc 32. The contact element 36 has one end exposed at the outer side of the wall 28 to contact with one of the studs 23 and is normally influenced outwardly of the corresponding disc 31a by a spring 37. Movement of the contact element under the influence of the spring is limited by a stop collar 38 at the other end of the element which normally is held by the spring in abutment with the disc 32.

The switch contact members 16 and the contact studs 23 are spaced apart a distance sufficient to allow the setting control unit C to be slid inwardly and outwardly of the casing between them and the casing has an opening 39 to permit insertion and removal of the unit C. In order to prevent bumping of the contact elements 36 over the studs 23 during insertion and removal of the unit C and also to ensure proper location of the unit C with respect to the studs 23, the unit has runners 40 to slide in guide grooves 41 in the wall 20, and the guide grooves 41 have depressions 42 to receive protuberances 43 on the runners when the unit C has been located in proper position. As the unit C is slid into and out of the casing the protuberances 43 in the guide grooves 41 will hold the contact elements 36 in spaced relation to the studs 23 but when the protuberances 43 are seated in the depressions 42 the unit C is permitted to move downwardly so as to cause yielding contact of the contact elements 36 with their respective studs 23 and to properly position the unit.

The switch contact members 16, contact studs 29, contact elements 36, contact studs 23 and the electromagnetic coils 5 of the actuators B are connected in an electric circuit as shown by the wiring diagram of Figure 7. Here the casing D constitutes a part of the circuit and the rods 12 of the setting elements A have electrical contact with the casing. The contact studs 29 and the corresponding electromagnetic coils 5 for each setting element A are connected in parallel with each other, and each electrical contact member 16 and its corresponding group of contact studs 29 and electromagnetic coils 5 are connected in parallel with the corresponding parts associated with the other setting elements. Accordingly each contact stud 29 with the corresponding switch contact member 16 controls the circuit through one of the electromagnetic coils 5, and when the setting element A is depressed the circuits will be closed through the corresponding studs 29 and the electromagnetic coil 5 controlled by each thereof. Thus, it will be evident that by connecting the contact studs 29 of a given setting element with different contact elements 36, one setting element may control the operation of a plurality of the actuators B and the corresponding operating elements 1 of the calculating machine.

From the foregoing it is clear that by proper manipulation and arrangement of the wires 34, any contact stud 29 can be connected to any contact element 36, and accordingly the setting control unit C can be so constructed and have the various contact studs 29 and 36 so interconnected that anyone setting element A may control one or more operating elements 1 as desired.

Therefore by utilizing a plurality of the setting control units C interchangeably and by proper interconnection of the contact studs 29 and 36, the setting mechanism may be utilized with the calculating machine to handle any one of many different computation problems; for example, to calculate interest on money or to calculate the quantity and cost of gas or electricity supplied during a given period of time, or to compute payroll money, etc.

Figure 6:
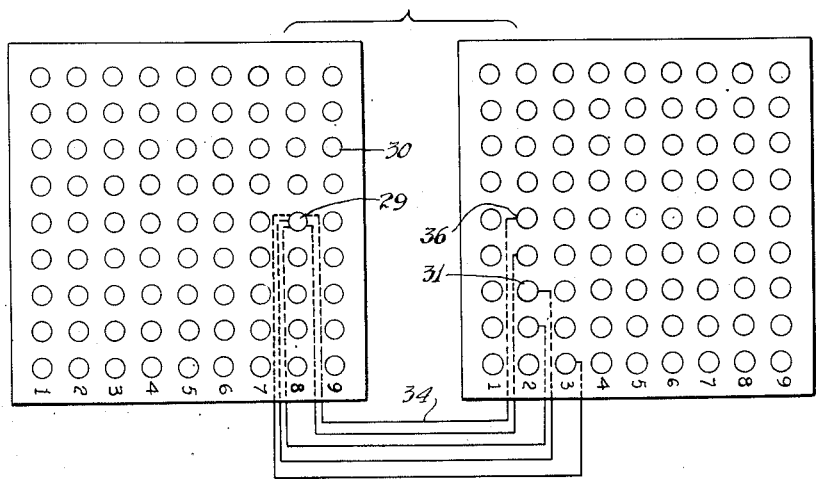
Figure 6 is a schematic plan view of the two walls of the setting control unit showing the electrical connections between certain of the contact elements.

In the drawings I have shown the setting mechanism especially designed for the computation of interest on money, and each of several of the setting elements or master keys A represents one item in the principal amount which for example may be taken as $9876. In this case the master key "9" in column f of Figure 1 would represent the item $9000 in the principal amount, the "8" key in column *e* will represent the item $800, the "7" key in column *d* will represent $70 and the "6" key in column *c* will represent $6. The contact studs 29 corresponding to said keys will be connected by the wires 34 to the contact elements 36 which correspond to the numbers on the calculating machine keys that comprise the representation of the amount of interest at a given rate and for a given period of time on the corresponding said item. For example, assuming we are computing interest at the rate of 1% for one day on the item of $800, the contact studs 29 corresponding to the "8" key in column *e* will be connected to the contact elements 36 corresponding to the "2" keys in columns *b*, *c*, *d* and *e* and the "3" key of column *a* as shown in Figure 6 so that when the setting element A is actuated and thereafter the handle 3 of the calculating machine is operated, the amount: .022223 will be registered in the window openings 2. The master keys or setting elements A for the several items will be operated in succession, with proper manipulation of the handle 3 of the calculating machine, and then upon operation of the totalizing key 4 followed by operation of the handle 3, amounts of interest on all of said items will be added and the total, representing the amount of interest for the principal amount will be registered.

For calculating at different rates of interest the contact studs 29 will of course be connected to different contact elements 36 because of the numerical differences in the computation; and in accordance with the invention, a plurality of the setting control units C will be utilized, each having the contact studs 29 and 36 interconnected in different ways to correspond to different rates of interest. Calculations for different periods of time may be taken care of in a similar manner. Accordingly when it is desired to modify the setting mechanism to adapt it for different problems of computation, it is simply necessary to interchange the proper setting control units C.

As hereinbefore indicated, the portion of the setting mechanism above and including the wall 20 of the casing having the contact studs 23 might be constructed as a portable unit and be located in remote relation to the calculating machine and the actuators B, in which case the wires 25 simply would be lengthened and preferably combined into a cable so as to maintain the electrical connection between the studs 23 and the corresponding electromagnetic coils 5. Also, the keys 1 of the calculating machine might be omitted and the actuators B directly connected to the interior parts of the calculating machine which are operated by the keys.

A modification of my invention is shown in Figures 9 to 11, inclusive wherein the setting mechanism includes a plurality of setting elements 50 which are shown as arranged in nine vertical rows *a*, *b*, *c*, *d*, *e*, *f*, *g*, *h*, and *k* and nine horizontal rows numbered 51 to 59 with each setting element common to a horizontal row and a vertical row, said arrangement corresponding to the arrangement of the operating members of the calculating machine which may be the same as the calculating machine hereinbefore described. As shown, the setting elements 50 are in the form of keys comprising bell cranks pivotally mounted on rods 62 in the cover 63 of a casing 64. Each bell crank has at one end a finger piece 65 which bears the proper numeral and its other end is adapted to frictionally abut the lug 66 on a switch bar 67 that is longitudinally slidably mounted at its ends in guide grooves 68 and 69 in the frame 70 that is slidable in guide grooves 71 in the casing 64 through an opening 65 in front of the casing so that said frame can be easily inserted into and removed from the casing. With this construction, upon depression of any of the finger pieces 65, the corresponding switch bar 67 will be longitudinally slid in one direction, to the right in Figure 10. Upon release of the finger piece the bar 67 is returned to its initial position by a spring 71' that is interposed between the end of the bar and one side of the frame 70.

The cover 63 is hingedly and removably connected to the casing 64 by means of separable hinges 73 of known construction, to permit insertion and removal of the frame 70 without interference of the lugs 66 with the setting elements 50, and preferably each setting element has a spring 72 normally influencing said element into its normal position which is illustrated in Figure 10 whereby proper cooperation of the setting elements with their respective lugs 66 will be assured when the cover 63 is arranged over the switch bars 67.

Mounted within the frame 70 are a plurality of electrical contact members 74 which are shown in the form of rods that have their ends seated in the opposite sides of the frame, there being one rod for each of the horizontal and vertical rows of operating members. Each switch contact bar 67 has two or more lugs 75 each to have circuit closing and circuit opening cooperation with one of the contact rods 74 when the bar is actuated by its corresponding setting element 50; and each of the contact rods 74 is electrically connected in circuit with an electrically operated device, for example, one of the electromagnets 5.

It will be understood that by varying the number and position of the contact lugs 75 various ones of the operating elements may be actuated at the same time upon operation of any one setting element 50 in a manner similar to that in which the number of contact studs 29 of the form of the invention shown in Figure 1 determines the number of actuators B and corresponding operating elements 1 that are operated upon depression of any one of the setting elements A.

By interchanging of different bars 67 the particular keys to be controlled by any setting element may be determined and varied, and if desired different combinations of bars 67 may be arranged in different frames 70 to serve as interchangeable units.

It will be understood that while I have shown the new preferred embodiments of my invention, the details of construction of the setting mechanism may be widely modified and changed within the spirit and scope of the invention.

To avoid circumlocution in the claims, it should be understood that the switch contact members 16 and 67 are considered to be parts of the respective setting elements, and the contact rods 74 and studs 23 are considered to be parts of the means for actuating the operating members or the corresponding actuators B. Also, the setting control unit C is considered to be a unit removably arranged between said parts 16 and 23, and the frame 70 with the assembled bars 67 and rods 74 constitute a removable or interchangeable unit interposed between the setting elements 50 and the means for actuating the operating members.

What I claim is:

1. The combination of electrical contact members, a series of setting elements, a switch part operable by each setting element for circuit-closing cooperation with at least two of said contact members, each said contact member comprising an electricity conducting rod and said rods being arranged in spaced parallel relation to each other, and each said switch part comprising a conducting bar reciprocable transversely of said rods in spaced relation thereto and having contact lugs each to contact with at least one of said rods.

2. The combniation of electrical contact members, a series of setting elements, a switch part operable by each setting element for circuit-closing cooperation with at least two of said contact members, a casing each said contact member comprising an electricity conducting rod mounted in and insulated from said casing and said rods being arranged in spaced parallel relation to each other, each said switch part including a bar in and insulated from said casing and reciprocable transversely of said rods in spaced relation thereto and having contact lugs each to contact with at least one of said rods, and each setting element being movably mounted in said casing and having an operative connection with one of said bars.

3. The combination with a plurality of electrically operated devices, a switch mechanism including electrical contact members each corresponding to at least one of said electrically operated devices, a series of setting elements, a switch part operable by each setting element for circuit-closing cooperation with at least two of said contact members, each said contact member comprising an electricity conducting rod and said rods being arranged in spaced parallel relation to each other, and each said switch part comprising a conducting bar reciprocable transversely of said rods in spaced relation thereto and having contact lugs each to contact with at least one of said rods.

JOHN T. TIERNEY.

REFERENCES CITED

The following references are of record in the file of this patent:

UNITED STATES PATENTS

| Number | Name | Date |
| --- | --- | --- |
| 1,659,050 | Sasseman | Feb. 14, 1928 |
| 1,695,712 | Johnson | Dec. 18, 1928 |
| 1,753,991 | Langford | Apr. 8, 1930 |
| 1,804,086 | Brodt | May 5, 1931 |
| 2,014,432 | Gerhold | Sept. 17, 1935 |
| 2,293,127 | Fishack | Aug. 18, 1942 |